(12) United States Patent
Osborn et al.

(10) Patent No.: US 11,734,695 B2
(45) Date of Patent: *Aug. 22, 2023

(54) ACCESSING AND UTILIZING MULTIPLE LOYALTY POINT ACCOUNTS

(71) Applicant: Capital One Services, LLC, McLean, VA (US)

(72) Inventors: Kevin Osborn, Newton, MA (US); Srinivasa Chigurupati, Long Grove, IL (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,642

(22) Filed: Feb. 7, 2023

(65) Prior Publication Data

US 2023/0186314 A1 Jun. 15, 2023

Related U.S. Application Data

(63) Continuation of application No. 17/132,497, filed on Dec. 23, 2020, now Pat. No. 11,605,091, which is a (Continued)

(51) Int. Cl.
*G06Q 20/40* (2012.01)
*G06Q 30/0226* (2023.01)
(Continued)

(52) U.S. Cl.
CPC ... *G06Q 20/40975* (2013.01); *G06Q 20/3278* (2013.01); *G06Q 20/341* (2013.01); *G06Q 20/352* (2013.01); *G06Q 20/3829* (2013.01); *G06Q 20/40* (2013.01); *G06Q 30/0233* (2013.01)

(58) Field of Classification Search
CPC ............... G06Q 20/00–425; G06Q 30/00–08
See application file for complete search history.

(56) References Cited

U.S. PATENT DOCUMENTS 8,317,086 B2 * 11/2012 Dudek ............... G06Q 20/209
 705/16
9,940,637 B2 * 4/2018 Van Os ............ G06Q 30/0207
(Continued)

*Primary Examiner* — John W Hayes
*Assistant Examiner* — Chenyuh Kuo
(74) *Attorney, Agent, or Firm* — KDW Firm PLLC

(57) ABSTRACT

Various embodiments are generally directed to utilizing an offline and/or online verification or authentication protocol to access, redeem, or otherwise utilize multiple loyalty points and loyalty accounts A method for utilizing various loyalty points includes: receiving, by an application executing on a processor, a request to redeem at least one loyalty point of a plurality of loyalty points of a loyalty points account, receiving, by the application, a cryptogram from a contactless card associated with an account, transmitting, by the application to a server, the cryptogram, determining, by the application based on a decryption result received from the server, that the server decrypted the cryptogram, and authorizing, by the application based on the determination that the server decrypted the cryptogram, the request to redeem the at least one loyalty point.

20 Claims, 7 Drawing Sheets

Related U.S. Application Data continuation of application No. 16/727,294, filed on Dec. 26, 2019, now Pat. No. 10,909,544.

(51) Int. Cl.
*G06Q 20/32* (2012.01)
*G06Q 20/34* (2012.01)
*G06Q 20/38* (2012.01)

(56) References Cited

U.S. PATENT DOCUMENTS

| | | | |
|---|---|---|---|
| 11,296,862 B2* | 4/2022 | Bellenger | H04L 9/321 |
| 2014/0074581 A1* | 3/2014 | Johnson | G06Q 30/02 |
| | | | 705/14.33 |
| 2015/0112870 A1* | 4/2015 | Nagasundaram | G06Q 20/385 |
| | | | 705/67 |
| 2015/0235256 A1* | 8/2015 | Barsoum | G06Q 20/02 |
| | | | 705/14.33 |
| 2015/0262161 A1* | 9/2015 | McMullan | G06Q 20/209 |
| | | | 705/39 |
| 2015/0363781 A1* | 12/2015 | Badenhorst | G06Q 20/385 |
| | | | 705/44 |
| 2018/0060898 A1* | 3/2018 | Sharma | G06Q 20/36 |

\* cited by examiner

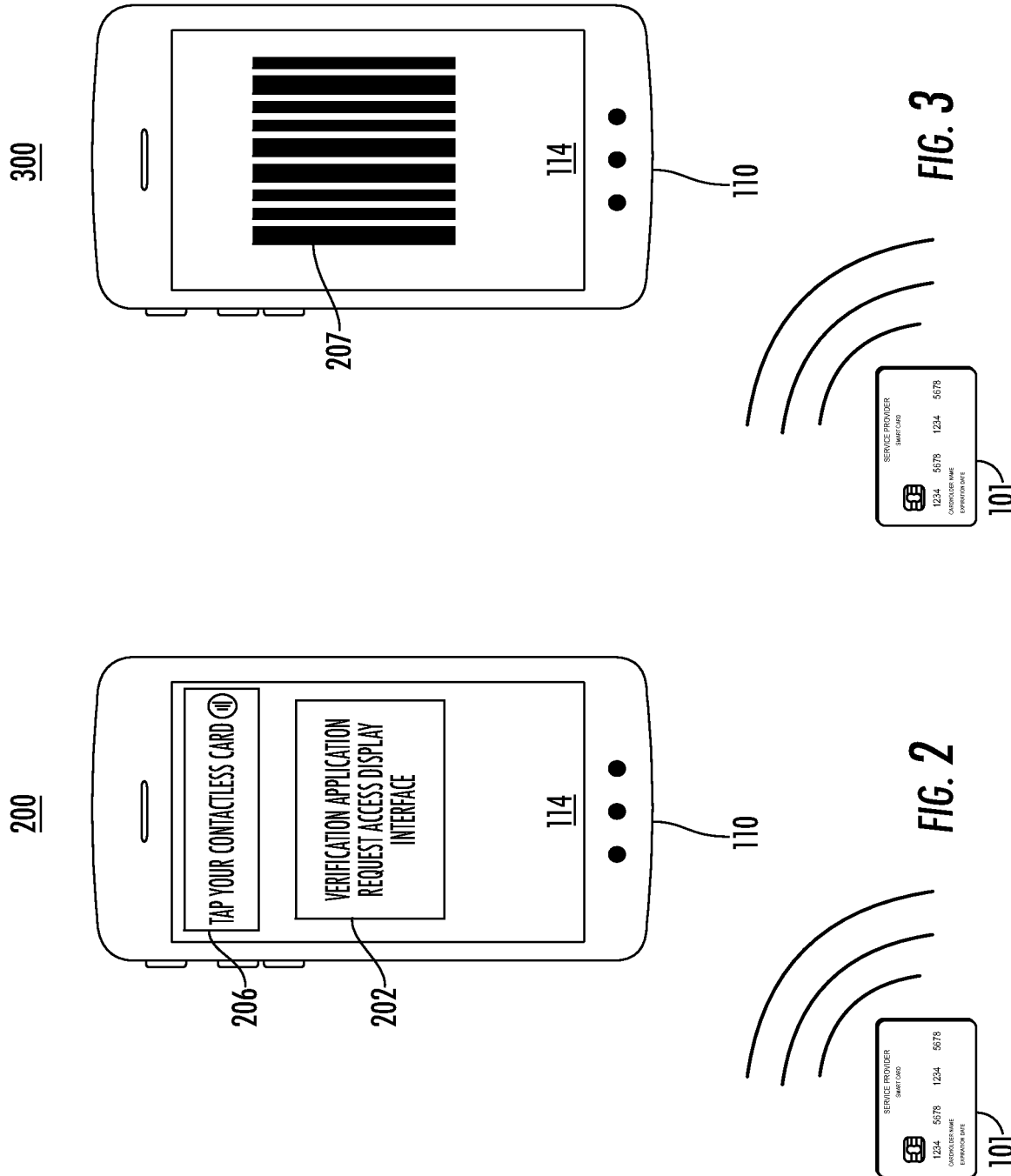

ACCESSING AND UTILIZING MULTIPLE LOYALTY POINT ACCOUNTS

CROSS-REFERENCE TO RELATED APPLICATIONS

This application claims priority to and is a continuation of U.S. patent application Ser. No. 17/132,497 filed on Dec. 23, 2020, which claims priority and is a continuation of U.S. patent application Ser. No. 16/727,294 filed on Dec. 26, 2019 (issued as U.S. Pat. No. 10,909,544 on Feb. 2, 2021). The contents of the aforementioned patent and patent applications are incorporated herein by reference in their entireties.

TECHNICAL FIELD

Embodiments herein generally relate to computing platforms, and more specifically, accessing multiple loyalty accounts utilizing various authorization protocols.

BACKGROUND

Activating many cards, and more specifically financial cards (e.g., credit cards), involve the time-consuming process of cardholders calling a telephone number or visiting a website and entering or otherwise providing card information. Further, while the growing use of chip-based financial cards provides more secure features over the previous technology (e.g., magnetic strip cards) for in-person purchases, account access still typically relies on log-in credentials (e.g., username and password) to confirm a cardholder's identity and/or otherwise complete a transaction. However, if the log-in credentials are compromised, another person could have access to the user's account.

The problem of account security becomes exacerbated when attempting to efficiently accessing multiple accounts, as a single authorization credential or mechanism can pose as an aggravated security risk if it is compromised, whether the account access relates to payments, redemption activity, or general access.

Accordingly, there is a need to improve authentication mechanisms for account access and the competition of transactions, including payment and redemption transactions.

SUMMARY

Embodiments disclosed herein provide systems, methods, articles of manufacture, and computer-readable media for utilizing a steganographically encoded image to verify a user and/or complete a transaction, including but not limited to a payment transaction. According to one or more examples, an online protocol is used to verify and/or authenticate a user in order to initiate an exchange of information that provides access to (or otherwise utilizes) one or more accounts associated with loyalty points.

According to one example, a computer implemented method utilizing application executing on a computer system may initiate a transaction to verify an identity of a user and/or authorizing a transaction by utilizing a steganographically encoded image. (In various embodiments, the application may be launched by tapping the contactless card on a user device, e.g. a mobile device). The method can include: determining, by an application executing on a processor circuit, that a user is requesting access to a loyalty points account database, receiving, by the application, encrypted data from a communications interface of a contactless card associated with an account, the encrypted data generated based on a cryptographic algorithm and a diversified key, the diversified key stored in a memory of the contactless card and generated based on a master key and a counter value stored in the memory of the contactless card, receiving, by the application and from a server, a verification of the user, the verification including verifying a data combination that includes the encrypted data, the server to decrypt the data combination based on the cryptographic algorithm and the diversified key stored in a memory of the server to verify the data combination, the diversified key stored in the memory of the server generated based on a master key and a counter value stored in the memory of the server, and responsive to receiving the verification of the user, accessing the database associated with a loyalty points account of the user, and authorizing a redemption of a plurality of loyalty points associated with the loyalty points account.

According to another example, a system employing online and/or offline authentication and the steganographically encoded image to authenticate and/or verify a user and/or authorize a transaction. The system can include: a processor circuit, and a memory storing instructions which when executed by the processor circuit, cause the processor circuit to: initiate, by an application executing on the processor circuit, a request to perform at least one operation related to a plurality of accounts associated with a plurality of loyalty points, receive, by the application, encrypted data from a communications interface of a contactless card associated with an account, the encrypted data generated based on a cryptographic algorithm and a diversified key, the diversified key stored in a memory of the contactless card and generated based on a master key and a counter value stored in the memory of the contactless card, receive, by the application and from a server, verification of the encrypted data, the server to decrypt the encrypted data based on the cryptographic algorithm and the diversified key stored in a memory of the server to verify the encrypted data, the diversified key stored in the memory of the server generated based on a master key and a counter value stored in the memory of the server, and in response to receiving the verification, granting authorization to perform the at least one operation, wherein the at least one operation includes at least one of i) accessing a database containing a plurality of loyalty identifiers associated with at least one user and at least two distinct accounts, each account associated with a distinct set of loyalty points and ii) storing at least one of the plurality of loyalty identifiers with respect to the at least two distinct accounts in the database.

According to yet another example, a host system associated with an issuer of a card associated with a user, the host system including a non-transitory computer-readable storage medium storing computer-readable program code executable by a processor to: generate a data combination, the data combination including i) a loyalty identifier of at least one user account associated with a plurality of loyalty account and ii) encrypted data generated based on a cryptographic algorithm and a diversified key, and decrypt the encrypted data based on the cryptographic algorithm and the diversified key stored in a memory of the server to verify the encrypted data, the diversified key stored in the memory of the server generated based on a master key and a counter value stored in the memory of the server.

BRIEF DESCRIPTION OF THE DRAWINGS

FIG. 2 illustrates at least one embodiments of tapping to verify a user utilizing an authorization protocol.

FIG. 3 illustrate at least one embodiment of generating a barcode based on the tapping and verification of FIG. 2.

DETAILED DESCRIPTION

Aspects of the present disclosure include systems, methods, and/or techniques for providing authenticated cardholder access. Generally, various embodiments relate to accessing or otherwise utilizing one or more loyalty point accounts by utilizing and generating a barcode utilizing an online authentication protocol, where the barcode may be utilized for completing one or more transactions, including a payment transaction. In various embodiments, a barcode is generated pursuant to an online authentication protocol, but in order to further enhance security, it is valid only for a single transaction, and thereafter expires to prevent an inappropriate use of an application associated with the single transaction. Consistent with the disclosed embodiments, the systems and methods may utilize one or more computing devices, processors, web servers, account servers, and/or contactless devices (e.g., radio frequency identification (RFID) cards).

Various embodiments of the present disclosure provide one or more benefits in terms of verifying a user and completing a transaction, such as a payment transaction, including taking advantage of enhanced security offered by dynamic authentication techniques, e.g. online techniques, while also utilizing a barcode to complete a transaction (which offers both convenience and additional security). In various embodiments, utilizing the online technique enhances the efficiency of a computer device, e.g. a mobile phone, by providing a single method for authenticating or verifying a user across one or more applications, even if the one or more applications are distinct in their purpose, e.g. a transportation application in relation to an entertainment application. Accordingly, in various embodiments, an authorization protocol can be used to efficiently and more securely authenticate a user across different applications and purposes, and then utilize a barcode generated as a result of the verification to complete a transaction associated with one or more of the different applications, including transactions and operations that may or may not involve making a payment.

Figure 1:
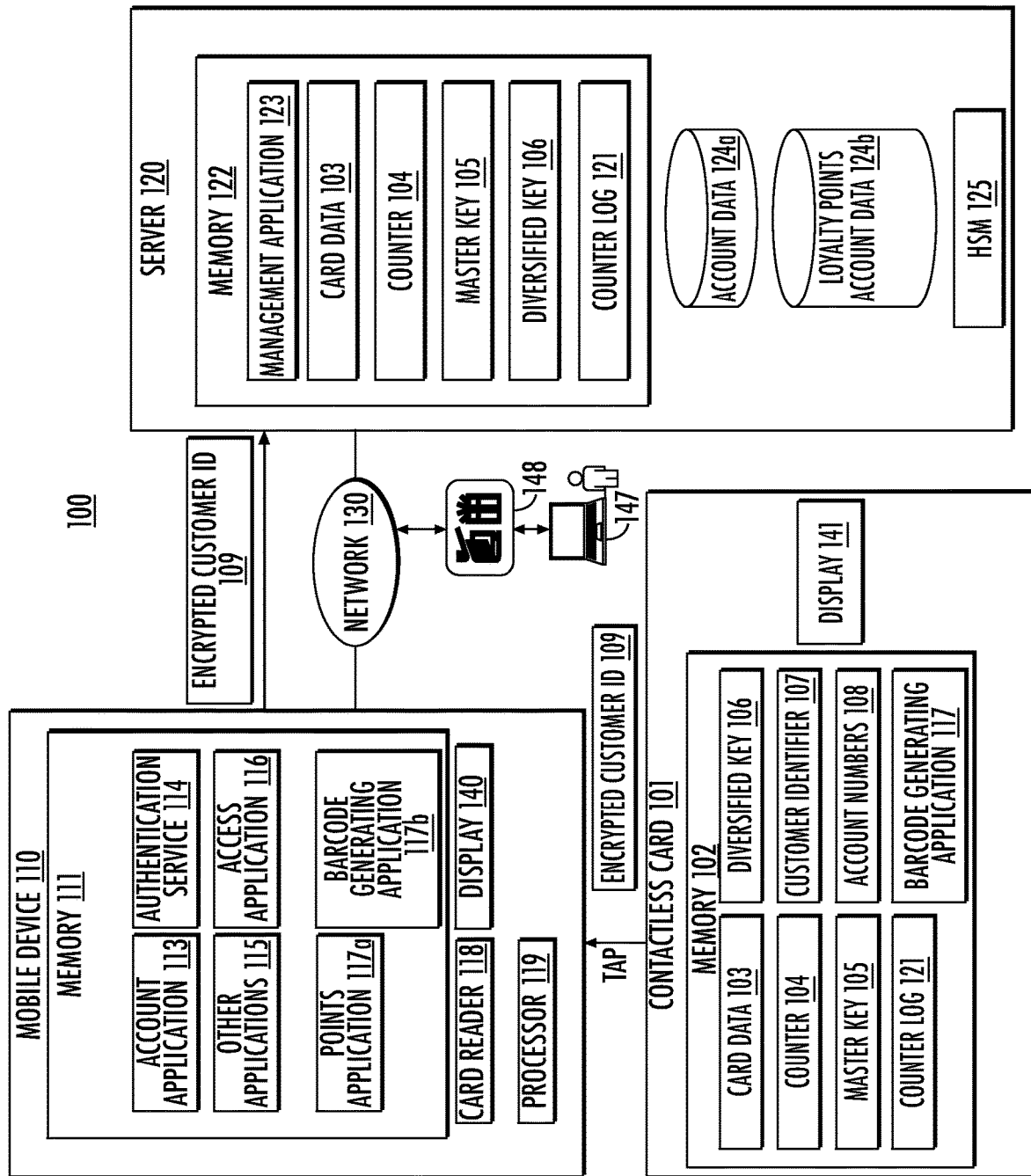
FIG. 1 illustrates an embodiments of a system for verifying or authenticating a user according to a payment protocol.

FIG. 1 depicts a schematic of an exemplary system 100, consistent with disclosed embodiments. As shown, the system 100 includes one or more contactless cards 101, one or more mobile devices 110, and a server 120. The contactless cards 101 are representative of any type of payment card, such as a credit card, debit card, ATM card, loyalty account card, gift card, and the like. In various embodiments, the contactless card 101 or card 101 is a virtual payment card. The contactless cards 101 may comprise one or more chips (not depicted), such as a radio frequency identification (RFID) chip, configured to communicate with the mobile devices 110 via NFC, the EMV standard, or other short-range protocols in wireless communication. Although NFC is used as an example communications protocol, the disclosure is equally applicable to other types of wireless communications, such as other suitable communication protocols pursuant to the EMV standard, Bluetooth, and/or Wi-Fi. The mobile devices 110 are representative of any type of network-enabled computing devices, such as smartphones, tablet computers, wearable devices, laptops, portable gaming devices, and the like. The server 120 is representative of any type of computing device, such as a server, workstation, computer cluster, cloud computing platform, virtualized computing system, and the like.

As shown, a memory 102 of the contactless card includes card data 103, a counter 104, a master key 105, a diversified key 106, a unique customer identifier 107, and a data store of account numbers 108. The card data 103 generally includes account-related information, such as information used to process a payment using the contactless card 101. For example, the card data 103 may comprise an account number, an expiration date, a billing address, and a card verification value (CVV). The account number may be any type of account number, such as a primary account number (PAN), a virtual account number, and/or a token generated based on the PAN. Other types of account numbers are contemplated, and the use of the account number or other types of card data 103 should not be considered limiting of the disclosure. The card data 103 may further include names, billing address, shipping address, and other account-related information. The account numbers 108 store one-time-use virtual account numbers with associated expiration dates and CVV values. For example, the account numbers 108 may include thousands single-use virtual account numbers, expiration dates, and CVV values.

As shown, a memory 111 of the mobile device 110 includes an instance of an operating system (OS) 112 and a processor 119 may execute one or more operations associated with the applications of the operating system (OS) 112 and/or perform any other suitable operation associated with processor activity, including comparison operations and executing instructions associated with memory 111. Example operating systems 112 include the Android® OS, iOS®, Linux®, and Windows® operating systems. As shown, the OS 112 includes one or more applications, including an account application 113, an authentication or verification application or service 114 (hereinafter referred to as "authentication application" for convenience), one or more other applications 115, and/or one or more access applications 116. The account application 113 allows users to perform various account-related operations, such as viewing account balances, purchasing items, and processing payments. Initially, a user may authenticate using authentication credentials to access the account application 113. For example, the authentication credentials may include a username and password, biometric credentials, and the like.

The authentication application 114 is generally configured to determine when a user requires authentication for a transaction, service, or accessibility request, including for completing a payment associated with an application. For example, the authentication application 114 may determine that a user requires access to a particular application and/or to complete a transaction or payment associated therewith, such as access application 116. Access application 116 may be or may include an application configured to grant access to one or more features of a particular service associated with a user account, such as a transportation service (e.g. public transit), bank account, health insurance account, a financial account or financial application that contains account balances, brokerage information, or any other suitable financial data, a service application (retail services, delivery services, entertainment services, gaming services, etc.), and any other suitable application that may require user authentication. In various embodiments, the access application 116 may be associated with a payment feature, e.g. a credit or bank account for making or receiving payment, and/or the authentication transaction may still implicate a non-payment feature for authentication or verification, e.g. credit or debit card activation. In various embodiments, access application 116 is a retail or goods/services provision application, and one or more features associated with access application 116 involves completing a payment in association with goods or services offered in relation to access application 116, where, as discussed below, the transaction or payment in association therewith can be completed by scanning a barcode generated pursuant to an online authorization protocol. In various embodiments, the authentication application 114 may facilitate the authentication protocol utilizing a separate API interface and call for access to access applications 116. The authentication application 114 may be configured to verify a user by utilizing any suitable protocol, including one or more of any verification process utilizing cryptographic techniques, an EMV standard or authentication protocol compliant with an EMV standard. In various embodiments, the authentication application 114 is configured to synchronize a counter 104 associated with a contactless card 101 and a server 120 associated with an issuer that can communicate with the contactless card 101 and the mobile device when an authentication of a user takes place.

In various embodiments, the authentication application 114 may coordinate with the server 120 and/or the contactless card 101 to log an authorization for a non-payment transaction in relation to a counter 104. The log may be a counter log 121 located in a memory 122 of the server 120 or a memory 102 of the contactless card 101. The log may keep a separate transaction tally of transactions that are payment transactions and non-payment transactions, irrespective of the total tally of the counter 104, and the server 120 or the contactless card 101. The server 120 and/or the authentication application 114 communicating with the contactless card may utilize the information contained therein for an anti-fraud measure. For example, the authentication application 114 and/or the server 120 may decline a payment transaction if a threshold number of non-payment transactions is too small (or too large) in between the non-payment transactions and the payment transaction or vice versa. In various embodiments, the counter log 121 containing distinguishing information, e.g. counts, between non-payment and payment transactions may be used for any other suitable purposes during an online verification protocol.

In various embodiments, the authentication application 114 is associated with the account application 113. For example, the authentication application 114 may be installed on the mobile device 110 with the account application 113, and the user is prompted to enable the authentication application 114 subsequent to the installation. More generally, each time the account application 113 is opened, the account application 113 may determine whether the authentication application 114 is enabled as the default authentication application for the OS 112. If the authentication application 114 is not enabled as the default authentication application, the account application 113 may prompt the user to enable the authentication application 114 as the default authentication application for the OS 112 and/or to enable one or more functionalities of the authentication application 114. Once enabled as the default authentication application for the OS 112, the authentication application 114 may programmatically identify when authorization applications require authentication and may utilize a payment protocol to enable the verification, even if a payment is not associated with the verification or authorization. In various embodiments, in order to initiate an authentication or verification protocol (e.g. at least one operation associated with an online verification technique or protocol), the authentication application 114 may prompt the user to tap a contactless card 101 to the mobile device 110 to initiate the authentication application 114 or one or more operations associated therewith.

Generally, in various embodiments described herein, an online verification or authentication protocol may include one or more of the following operations: the authentication application may initiate a transaction to verify an identity of a user, where the authentication application may initiate the application in whole or in part, e.g. access application 116 and/or generate a barcode that can be scanned to access a feature of application 116 and/or complete a transaction in association therewith, by prompting the user to tap a contactless card 101 on a computer device, e.g. mobile device 110. The transaction may involve an NFC communication between a card reader 118 and a contactless card 101, where the contactless card 101 may provide the mobile device 110 with one or more inputs, including a latest version of an application transaction counter (ATC), and the contactless card 101 or the mobile device 110 (including any suitable components associated therewith) may generate a suitable cryptogram based on the plurality of inputs, and then the contactless card 101 or the mobile device 110 (including any suitable components associated therewith) may transmit the cryptogram and the ATC to an issuer of the contactless card 101 (e.g. a server 120 associated with the issuer). The user may then be verified and receive access to one or more features associated with application 116 by receiving a response from the issuer verifying or authorizing the user, where the received response is based on at least one cryptographic operations performed by the issuer (e.g. server 120) in response to receiving the cryptogram. For example, if the server 120 is able to decrypt the cryptogram, the server may transmit an indication to the mobile device 110 specifying that the cryptogram has been verified.

In various embodiments, once the user is verified, the server 120 may transmit an authentication token (using any suitable token generating technique) to the barcode generating application 117b associated with either the mobile device 110 and the contactless card 101, where the barcode generating application 117b may cause the display 140, 141 of either the mobile device 110 and/or the contactless card 101 to display a barcode that can be scanned by any suitable scanning device. The authentication token can be configured to grant access to one or more features of access application 116, including completing a payment transaction associated with the access application 116, and in various embodiments, in order to enhance the security associated with the transaction, the server 120 may configure the authentication token to authorize a single transaction associated with access application 116, and thereafter disabling the token/barcode from authorizing another operation in relation to access application 116 without another verification (online or offline) taking place.

In various embodiments, where the contactless card 101 is a virtual payment card, the authentication application 114 may retrieve information associated with the contactless card 101 by accessing a digital wallet implemented on the mobile device 110, where the digital wallet includes the virtual payment card.

As shown, the server 120 further includes a data store of account data 124a and a memory 122. The account data 124a includes account-related data for a plurality of users and/or accounts. The account data 124a may include at least a master key 105, counter 104, such as an application transaction counter ("ATC") 104 a customer ID 107, an associated contactless card 101, account holder name, account billing address, one or more shipping addresses, one or more virtual card numbers, and biographical information for each account. The memory 122 includes a management application 123 and instances of the card data 103, the counter 104, master key 105, and diversified key 106 for one or more accounts from the account data 124a. The system may further include one or more loyalty accounts 124b.

The system 100 is configured to implement key diversification to secure data, which may be referred to as a key diversification technique herein. The system 100 may implement an online authentication protocol.

In various embodiments, the authentication application 114 receives, from a user, a first application user credential associated with a user profile. The first application user credential may include biometrics data, an established gesture associated with user recognition, a username and password combination, and/or the like. The processor 119 compares the first application user credential with a stored second application user credential. The stored second application user credential may be associated with the user identity and it may be stored either in the memory 111 of mobile device 110 or in the memory 122 of the server 120. In various embodiments, the stored second application user credential is maintained on the server 120 and the first match is performed by the server 120. In various embodiments, upon determining a first match between the first application user credential and the stored second application user credential, the authentication application 114 may grant the user access to one or more first-level user account options of a user account associated with access application 116. The user account may be a financial account, a health insurance account, and/or any other account of the like associated with any service provider (e.g., a transit account, an entertainment account, etc.). Once the first match is determined, the user may access certain first-level user account options associated with access application 116, without the generation of a barcode occuring and without a completion of a transaction occuring, e.g. completion of a payment. The first-level user account options of a user account may include a display of an account balance, a display of recent transactions, and/or the like. For greater access and/or executing certain account functions, i.e., second-level user account options, such as executing a payment transaction, a second-level of authentication may be required, such as fully completing an online authentication protocol, generating an authentication token in response to successful completion of the protocol, and generating a barcode for scanning (utilizing the authentication token), where the scanning completes the transaction, e.g. payment, associated with access application 116.

Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124a of the server 120 (and/or stored in a different secure location). The master key may be kept secret from all parties other than the contactless card 101 and server 120, thereby enhancing security of the system 100.

The master keys 105 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the mobile device 110). To enable NFC data transfer between the contactless card 101 and the mobile device 110, the account application 113 may communicate with the contactless card 101 when the contactless card 101 is sufficiently close to a card reader 118 (e.g. within NFC range) of the mobile device 110. Card reader 118 may be a digital reader with NFC capabilities, e.g. an NFC reader, and may be configured to read from and/or communicate with contactless card 101 (e.g., via NFC, Bluetooth, RFID, etc.). Therefore, example card readers 118 include NFC communication modules, Bluetooth communication modules, and/or RFID communication modules.

For example, a user may require authorization or verification to access an access application 116. One or more components of the system 100, including authentication application 114 may initiate a communication (e.g. API call or another suitable mechanism) with the access application 116 to utilize one or more payment protocols to verify or authenticate the user, whether the access application 116, or a particular aspect sought for access by the user of the access application 116, does or does not involve making a payment.

In various embodiments, the one or more protocols may involve online techniques as discussed elsewhere herein. The authentication application 114 may provide a user with a prompt so that the user may tap the contactless card 101 to the mobile device 110, thereby bringing the contactless card 101 sufficiently close to the card reader 118 of the mobile device 110 to enable NFC data transfer between the contactless card 101 and the card reader 118 of the mobile device 110. In various embodiments, the mobile device 110 may trigger the card reader 118 via an API call. In addition, and/or alternatively, the mobile device 110 may trigger the card reader 118 based on periodically polling the card reader 118. More generally, the mobile device 110 may trigger the card reader 118 to engage in communications using any feasible method.

In various embodiments, prior to initiating any communication in relation to the contactless card 101, the card reader 118, and the mobile device 110, and/or immediately after establishing a communication between the contactless card 101 and the card reader 118, the authentication application 114 may receive a first application user credential as a precondition for card activation and/or for commencing with the online authentication protocol. A user may provide the first application user credentials after receiving a prompt from the authentication application to enter the credentials. As noted above, the first application user credentials may include biometrics data, an established gesture associated with user recognition, a username and password combination, facial recognition, and/or the like. As noted above, in various embodiments, the authentication application 114 communicates the first application user credentials to the processor 119. The processor 119 compares the first application user credentials with stored second application user credential. The stored second application user credential may be located within a memory 111 associated with the mobile device 110, the memory 102 associated with contactless card 101, and/or a memory 122 associated with the server 120. In various embodiments, the first application user credential is provided to the server 120, and the server 120 compares the first application user credential to the stored second application user credential. In various embodiments, as noted above, the processor 119 communicates the comparison result to the authentication application 114 (e.g., for a match). In various embodiments, a first match may initiate or serve as precondition for one or more of i) initiating the rest of the online verification protocol for verifying or authenticating the user to access the access application 116 and/or ii) granting the user access to first-level user account options of a user account associated with access application 116 (e.g., display of an account balance and/or recent transactions) and/or iii) generating an authentication token that is provided to barcode generating application 117b for generation of a barcode that can be scanned to access one or more features associated with access application 116 and/or otherwise complete a transaction in association therewith, e.g. a payment transaction. As such, in various embodiments, responsive to finding a first match the verification authentication application initiates additional operations (associated with the online verification process) to verify the user identity.

In various embodiments, system 100 includes a loyalty points application 117a that utilizes loyalty points associated with access application 116 and/or retailer 148 based on an online verification protocol that may or may not utilize a generated barcode associated with barcode generating application 117b. The loyalty points application 117a may allow the user to perform any number and type of operations related to loyalty points, such as viewing loyalty point balances, redeeming loyalty points for products, goods, and/or services, transferring loyalty points to other accounts, and the like. When the user requests to perform the operation in the loyalty points application 117a, the user may be required to verify their identity using the contactless card 101. As described in greater detail herein, the requested operation may be authorized based on the server 120 verifying encrypted data generated by the contactless card 101, the matching of application user credentials, and/or using a barcode generated by the barcode generating application 117b.

In various embodiments, the first match of the first application user credential to the stored second application user credential may or may not grant first-level access to an application, e.g. access application 116, but the first match serves may, in any event, serve as a precondition for initiating at least one of the online authorization protocol. In various embodiments where the first-level access was not granted initially, successful completion of the at least one online and/or offline protocol results in granting first-level access. In various embodiments, the second-level access to access application 116 is granted immediately upon completion of at least one of the online and/or offline verification protocols and scanning of a barcode generated as a result of completion of one of those protocols, where the second-level access may refer to completing a payment transaction in relation to access application 116.

In various embodiments, irrespective of any other preconditions, a first tap of the contactless card 101 on the mobile device 110 initiates the online and offline verification protocols and a second tap, subsequent tap, initiates the other one of the online and offline verification protocols.

In various embodiments, whether one or more preconditions is applied or takes place, after communication has been established between mobile device 110 and contactless card 101, the contactless card 101 generates a message authentication code (MAC) cryptogram. In various embodiments, this may occur when the contactless card 101 is read by the account application 113. In particular, this may occur upon a read, such as an NFC read, of a near field data exchange (NDEF) tag, which may be created in accordance with the NFC Data Exchange Format. For example, a reader, such as the account application 113 and/or the card reader 118, may transmit a message, such as an applet select message, with the applet ID of an NDEF producing applet. In various embodiments, the generated cryptogram may be an authorization request cryptogram (ARQC) consistent with an EMV standard.

In various embodiments, upon confirmation of the selection, a sequence of select file messages followed by read file messages may be transmitted. For example, the sequence may include "Select Capabilities file", "Read Capabilities file", and "Select NDEF file". At this point, the counter value 104 maintained by the contactless card 101 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In various embodiments, the MAC cryptogram may be transmitted as an NDEF tag, and in other examples the MAC cryptogram may be included with a uniform resource indicator (e.g., as a formatted string). The contactless card 101 may then transmit the MAC cryptogram to the mobile device 110, which may then forward the MAC cryptogram to the server 120 for verification as explained below. (However, in various embodiments, the mobile device 110 may verify the MAC cryptogram).

More generally, when preparing to send data (e.g., to the server 120 and/or the mobile device 110), the contactless card 101 may increment the counter value 104. The contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; a symmetric CMAC algorithm such as AES-CMAC; and/or any other algorithm or technique consistent with any applicable version of ISO/IEC 1833 and/or ISO/IEC 7816. The contactless card 101 may then encrypt the data (e.g., the customer identifier 107 and any other data) using the diversified key 106. The contactless card 101 may then transmit the encrypted data (e.g., the encrypted customer ID 109) to the account application 113 of the mobile device 110 (e.g., via an NFC connection, Bluetooth connection, etc.). The account application 113 of the mobile device 110 may then transmit the encrypted data to the server 120 via the network 130. In at least various embodiments, the contactless card 101 transmits the counter value 104 with the encrypted data.

In such embodiments, the contactless card 101 may transmit an encrypted counter value 104, or an unencrypted counter value 104.

Upon receiving the encrypted customer ID 109, the management application 123 of the server 120 may perform the same symmetric encryption using the counter value 104 as input to the encryption, and the master key 105 as the key for the encryption. As stated, the counter value 104 may be specified in the data received from the mobile device 110, or a counter value 104 maintained by the server 120 to implement key diversification for the contactless card 101. The output of the encryption may be the same diversified key value 106 that was created by the contactless card 101. The management application 123 may then decrypt the encrypted customer ID 109 received via the network 130 using the diversified key 106, which reveals the data transmitted by the contactless card 101 (e.g., at least the customer identifier 107). Doing so allows the management application 123 to verify the data transmitted by the contactless card 101 via the mobile device 110, e.g., by comparing the decrypted customer ID 107 to a customer ID in the account data 124a for the account. Once verified, the management application 123 may transmit an indication of the successful verification to the mobile device 110.

Although the counter 104, e.g. ATC, is used as an example, other data may be used to secure communications between the contactless card 101, the mobile device 110, and/or the server 120. For example, the counter 104 may be replaced with a random nonce, generated each time a new diversified key 106 is needed, the full value of a counter value sent from the contactless card 101 and the server 120, a portion of a counter value sent from the contactless card 101 and the server 120, a counter independently maintained by the contactless card 101 and the server 120 but not sent between the two, a one-time-passcode exchanged between the contactless card 101 and the server 120, and a cryptographic hash of data. In various embodiments, one or more portions of the diversified key 106 may be used by the parties to create multiple diversified keys 106.

As shown, the server 120 may include one or more hardware security modules (HSM) 125. For example, one or more HSMs 125 may be configured to perform one or more cryptographic operations as disclosed herein. In various embodiments, one or more HSMs 125 may be configured as special purpose security devices that are configured to perform the one or more cryptographic operations. The HSMs 125 may be configured such that keys are never revealed outside the HSM 125, and instead are maintained within the HSM 125. For example, one or more HSMs 125 may be configured to perform at least one of key derivations, decryption, and MAC operations. The one or more HSMs 125 may be contained within, or may be in data communication with, server 120.

As stated, the key diversification technique may be used to perform secure operations using the contactless card 101. For example, once the management application 123 verifies the encrypted customer ID 109 using key diversification, the management application 123 may transmit a message to the authentication application 114 (or any other component of the device 110, such as the account application 113, points application 117A, application 116, etc.) indicating that the user is verified and/or authenticated, and the authentication application 114 can grant the user access to the access application 116 as a result. In various embodiments, the output transmitted may include an authorization response cryptogram (ARPC). Generally, upon receipt of the message indicating the user is verified and/or authenticated based on verification of the encrypted customer ID 109, the receiving component of the mobile device 110 may permit any number of operations. For example, the points application 117A may permit access to a loyalty account, e.g., to view loyalty points, redeem loyalty points, etc.

As is inherent in one or more embodiments described herein, including the above discussion, the server 120 that may be used in an online authentication or verification and may be configured to operate consistent with an EMV standard, including performing operations that utilize an EMV payment protocol for non-payment purposes. The host server (or system) 120 may be associated with an issuer of a card associated with a user, and the host system including a non-transitory computer-readable storage medium storing computer-readable program code executable by a processor, where the processor and storage medium may contain one or more hardware or software components, including those generally described in FIG. 8. The host system may be configured to receive a transaction data associated with an access application 116 and/or a contactless card 101. The receipt of the transaction data may be facilitated as described herein, e.g. by a authentication application 114 (or other suitable component or application of mobile device 110) associated with a mobile device 110 and the user (or other suitable computer device), where the authentication application 114 may initiate an authentication or verification transaction with one or more other components, e.g. a contactless card 101 and a card reader 118. The transaction data received by the server 120 from the authentication application 114. The transaction data may include i) a counter (e.g. ATC) and a cryptogram based on one or more inputs of the transaction and a symmetric key associated with the card. In various embodiments, the cryptogram is an authorization request cryptogram (ARQC).

In various embodiments, once the server 120 receives the transaction data, the management application 123 may transmit a response (e.g. from the issuer) to a suitable component of the mobile device 110, e.g. authentication application 114, account application 113, points application 117a, etc., verifying the identity of the user based on the received cryptogram. Responsive to receipt of the verification response, the authentication application 114 may grant access to a relevant portion or feature of access application 116 as a result and/or facilitate generation of a barcode useful for completing a transaction associated with access application 116. In various embodiments, the response may include an authentication token provided to the barcode generating application 117b associated with the contactless card 101 and/or mobile device 110, which can be used by the barcode generating application 117b to display a barcode on either display 140 and/or display 141, where the barcode can be scanned by a suitable scanning device that can decrypt the authentication token in order complete a transaction associated with access application 116, e.g. a payment transaction, and/or otherwise provide access to a feature associated with access application 116. Furthermore, the access application 116 may permit access to a relevant portion or feature of another application on the mobile device 110, e.g., the account application 113 and/or the points application 117a. Similarly, the account application 113 and/or the points application 117a may receive the verification response and permit access to a relevant portion or feature of the application, such as accessing a loyalty points account in the points application 117a, authorizing transactions using loyalty points, etc.

In various embodiments, the management component 123 may configure the authentication token to be disabled once a single scan of the barcode takes place, where the scan grants access to a feature associated with access application 116 and/or otherwise completes a transaction associated therewith, which in turn can prohibit unauthorized subsequent use of the barcode to access aspects of access application 116. In various embodiments, the generated barcode can be used for more than one application, e.g. multiple access applications 116, depending on which selection a user decides to make, provided that the authentication protocol has taken place. In various embodiments, the management application 123 may receive, as part of the overall transaction data, instructions from a user or from the authentication application 114 to place a limit on a transaction associated with access application 116, e.g. a monetary restriction on a payment transaction, where the management application 123 configures the authorization token (and by extension the subsequently generated barcode) to implement the limit. In various embodiments the authorization token can be a payment token authorizing a payment transaction in relation to access application 116 with or without a pre-stipulated user limit as to the amount that can be spent.

Accordingly, in various embodiments, the generated barcode as outlined herein may be a dynamic barcode displayed on either the mobile device 110 and/or a surface of the contactless card 101 with at least one of the following features: i) the barcode can be configured to be disabled after a single use; ii) the barcode can be utilized for more than one access application 116 (provided the authentication protocol associated with the authentication token takes place), including a single or multiple use case, e.g. in the single use case, once the barcode is generated, but before a scan takes place, the authentication application 114 may permit the user to access another access application 116 and utilize the barcode without requiring any protocol to run again (e.g. the counter log 121 can be utilized by the authentication application 114 to ensure that a subsequent transaction after generation of the barcode has not taken place, which in turn can permit the user to switch use of the barcode to another access application 116 and/or to access another feature of the originally selected access application 116, distinct from what was originally selected); iii) the barcode can be configured to remain active for multiple scans and for different access applications 116 once the verification protocol takes place; and/or iv) the authorization token (and by extension the barcode) may be configured to be associated with a pre-stipulated limit (by the user or otherwise) in relation to the transaction associated with access application 116, e.g. placing a monetary limit on a payment transaction to be completed with respect to access application 116. It is noted that in various embodiments the described features of this paragraph apply not only to a barcode generated with respect to the online protocol described above, but with respect to any other protocol described herein.

In various embodiments, the server 120 may utilize the counter log 121 to perform an antifraud measure. In various embodiments, counter log 121 may include time stamps associated with the counter value associated with one or more non-payment transaction. In various embodiments, the counter log 121 may include time stamps associated with the counter value associated with one or more payment transactions. In various embodiments, the counter value of the ATC in relation to a particular transaction, e.g. whether it is a payment transaction or a non-payment transaction, may also be logged. The management application 123 may be configured to compare a general number of payment transactions that take place in between non-payment transactions. If the number of payment transactions after a non-payment transaction exceeds a certain threshold, the management application 123 may deny the payment transactions, even if otherwise the transaction may be completed (e.g. since it is assumed that a user may use the payment protocol for non-payment and payment protocol, an unduly large number of payment transactions after a non-payment transactions may be considered fraudulent). In various embodiments, the opposite may be implemented, e.g. a large number of non-payment transactions being performed after a payment transaction in excess of a threshold may cause the management application 123 to deny a certain non-payment transaction when the verification or authentication takes place. In various embodiments, a threshold in relation to time between any transaction, e.g. payment or non-payment, in terms of exceeding a minimum or maximum threshold may cause the management application 123 to deny the authentication or verification operation. The counter log 121 may be used to perform any other suitable operation, including perform an anti-fraud measure in any other suitable manner. In various embodiments, the anti-fraud measure can override a valid authorization token by instructing a suitable component of the mobile device, e.g. authentication application 114, to deny an application even if the authentication token associated with the barcode is valid.

FIG. 2 is a schematic 200 depicting an example embodiment of tapping to initiate an online verification and/or authentication protocol to generate a barcode for accessing a feature and/or completing a transaction in relation to access application 116. A graphical user interface (GUI) of the authorization application 114 on the mobile device 110 may include a prompt 206 to tap the contactless card 101 to initiate an authentication or verification for another application, e.g. access application 116, where a separate API interface may be provided to communicate the verification or authentication (once completed) to the access application 116 by the authentication application 114. In various embodiments, the access application 116 provides a prompt 202 as a precondition for receiving the tap prompt 206 or after the tap takes place, but prior to any additional online verification operations, to enter user credentials for comparison (e.g. as described with reference to FIG. 1) for a first-level and/or second-level of information access in relation to access application 116. In various embodiments, authentication application 114 provides an interface for the prompt 202 for entering the user credential with respect to access application 116 and/or any other application, e.g. other applications 115.

In various embodiments, once the contactless card 101 is tapped to the mobile device 110, the authentication application 114 transmits, via the card reader 118 (e.g., via NFC, Bluetooth, RFID, etc.), an indication to the contactless card 101. In various embodiments, the indication may specify to perform one or more encryption techniques as described with respect to FIG. 1. In various embodiments, an online authentication technique is used, and the authentication application 114 receives transaction data from the server 120. In various embodiments, the prompt to transmit data between the contactless card 101 and the mobile device 110 may specify to transmit the data to the authentication application 114 via any suitable protocol consistent with an EMV protocol or standard, where in various embodiments the authentication application 114 receives any suitable data directly from the contactless card 101 via a protocol consistent with an EMV protocol or standard.

FIG. 3 is a schematic 300 depicting an example embodiment of a generated barcode after tapping to initiate an online verification and/or authentication protocol (to generate the barcode), e.g. for accessing a feature and/or completing a transaction in relation to access application 116, takes place. In various embodiments, a barcode 307 is generated on the display of the mobile device that is suitable for scanning by any suitable scanning device. In various embodiments, the management application 123 of the server and/or the authentication application 114 of the mobile device 110 can provide an authentication token to a barcode generating application 117b associated with either mobile device 110 (as shown in FIG. 3) and/or contactless card 101, and the barcode generating application 117b may use the authentication token to generate a single use barcode 307 for granting access to one or more features of access application 116 (and/or completing a transaction in relation therewith) and/or for repeated use for granting access to one or more features of access application 116 (and/or completing a transaction in relation therewith). As another example, the barcode 307 may be used to authorize access to a loyalty account in the points application 117a and/or perform operations associated with the loyalty account in the points application 117a.

Figure 4A:
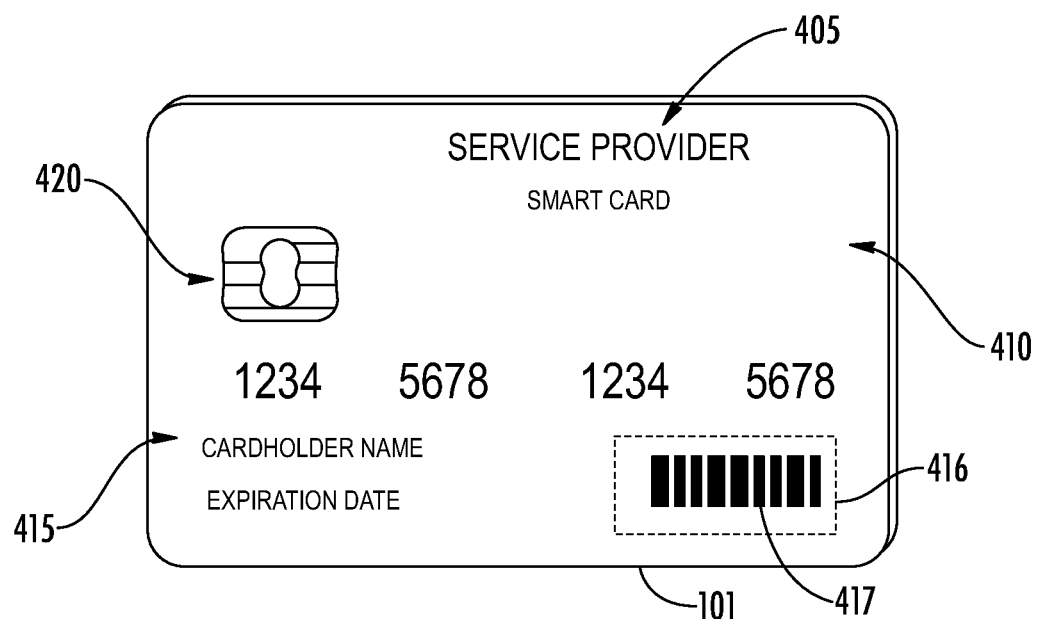
FIGS. 4A-4B illustrate an example contactless card.

FIG. 4A illustrates a contactless card 101, which may comprise a payment card, such as a credit card, debit card, and/or a gift card. As shown, the contactless card 101 may be issued by a service provider 405 displayed on the front or back of the card 101. In various embodiments, the contactless card 101 is not related to a payment card, and may comprise, without limitation, an identification card. In various embodiments, the payment card may comprise a dual interface contactless payment card. The contactless card 101 may comprise a substrate 410, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In various embodiments, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 415 displayed on the front and/or back of the card, and a contact pad 420. The contact pad 420 may be configured to establish contact with another communication device, such as the mobile devices 110, a user device, smart phone, laptop, desktop, or tablet computer. The contactless card 101 may also include processing circuitry, antenna and other components not shown in FIG. 4A. These components may be located behind the contact pad 420 or elsewhere on the substrate 410. The contactless card 101 may also include a magnetic strip or tape, which may be located on the back of the card (not shown in FIG. 4A). The contactless card 101 may include a display interface 416 which can display a barcode 417 that can be generated as described with reference to FIGS. 1-3 and 5-7B, where the barcode 417 can be scanned and decrypted by any suitable scanning device in order to grant access to features of an application and/or facilitate completion of a transaction associated with the application, such as a payment transaction.

Figure 4B:
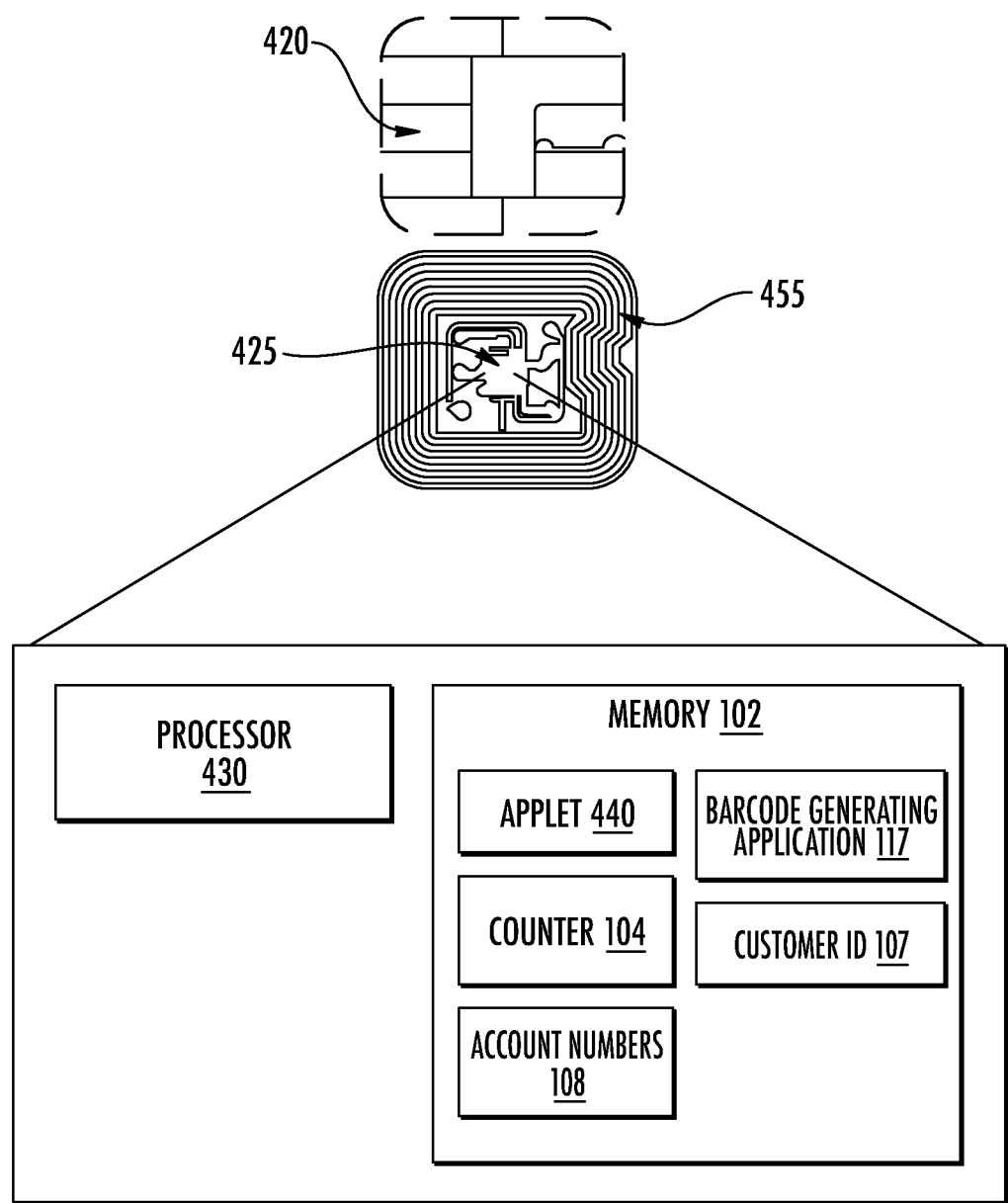

As illustrated in FIG. 4B, the contact pad 420 of contactless card 101 may include processing circuitry 425 for storing and processing information, including a microprocessor 430 and the memory 102. It is understood that the processing circuitry 425 may contain additional components, including processors, memories, error and parity/CRC checkers, data encoders, anticollision algorithms, controllers, command decoders, security primitives and tamper-proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to store one or more applets 440, one or more counters 104, a customer identifier 107, and the virtual account numbers 108. The one or more applets 440 may comprise one or more software applications configured to execute on one or more contactless cards, such as a Java® Card applet. However, it is understood that applets 440 are not limited to Java Card applets, and instead may be any software application operable on contactless cards or other devices having limited memory. The one or more counters 104 may comprise a numeric counter sufficient to store an integer. The customer identifier 107 may comprise a unique alphanumeric identifier assigned to a user of the contactless card 101, and the identifier may distinguish the user of the contactless card from other contactless card users. In various embodiments, the customer identifier 107 may identify both a customer and an account assigned to that customer and may further identify the contactless card associated with the customer's account. As stated, the account numbers 108 may include thousands of one-time use virtual account numbers associated with the contactless card 101. An applet 440 of the contactless card 101 may be configured to manage the account numbers 108. The memory 102 can be configured to contain a barcode generating application 117b that can generate a barcode 417, e.g. as shown in FIG. 4A, that can be scanned and decrypted by any suitable scanning device and for any suitable purpose as described herein.

The processor and memory elements of the foregoing exemplary embodiments are described with reference to the contact pad, but the present disclosure is not limited thereto. It is understood that these elements may be implemented outside of the pad 420 or entirely separate from it, or as further elements in addition to processor 430 and memory 102 elements located within the contact pad 420.

In various embodiments, the contactless card 101 may comprise one or more antennas 455. The one or more antennas 455 may be placed within the contactless card 101 and around the processing circuitry 425 of the contact pad 420. For example, the one or more antennas 455 may be integral with the processing circuitry 425 and the one or more antennas 455 may be used with an external booster coil. As another example, the one or more antennas 455 may be external to the contact pad 420 and the processing circuitry 425.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 455, processing circuitry 425, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets 440 may be added to contactless cards to provide a one-time password (OTP) for multifactor authentication (MFA) in various mobile application-based use cases. Applets 440 may be configured to respond to one or more requests, such as near field data exchange requests, from a reader, such as a mobile NFC reader (e.g., of the mobile device 110), and produce an NDEF message that comprises a cryptographically secure OTP encoded as an NDEF text tag.

One example of an NDEF OTP is an NDEF short-record layout (SR=1). In such an example, one or more applets 440 may be configured to encode the OTP as an NDEF type 4 well known type text tag. In various embodiments, NDEF messages may comprise one or more records. The applets 440 may be configured to add one or more static tag records in addition to the OTP record.

In various embodiments, the one or more applets 440 may be configured to emulate an RFID tag. The RFID tag may include one or more polymorphic tags. In various embodiments, each time the tag is read, different cryptographic data is presented that may indicate the authenticity of the contactless card. Based on the one or more applications, an NFC read of the tag may be processed, the data may be transmitted to a server, such as the server 120, and the data may be validated at the server.

In various embodiments, the contactless card 101 and server 120 may include certain data such that the card may be properly identified. The contactless card 101 may comprise one or more unique identifiers (not pictured). Each time a read operation takes place, the counters 104 may be configured to increment. In various embodiments, each time data from the contactless card 101 is read (e.g., by a mobile device 110), the counter 104 is transmitted to the server for validation and determines whether the counter values 104 are equal (as part of the validation).

The one or more counters 104 may be configured to prevent a replay attack. For example, if a cryptogram has been obtained and replayed, that cryptogram is immediately rejected if the counter 104 has been read or used or otherwise passed over. If the counter 104 has not been used, it may be replayed. In various embodiments, the counter that is incremented on the card is different from the counter that is incremented for transactions. The contactless card 101 is unable to determine the application transaction counter 104 since there is no communication between applets 440 on the contactless card 101. In various embodiments, the contactless card 101 may comprise a first applet 440-1, which may be a transaction applet, and a second applet 440-2. Each applet 440-1 and 440-2 may comprise a respective counter 104.

In various embodiments, the counter 104 may get out of sync. In various embodiments, to account for accidental reads that initiate transactions, such as reading at an angle, the counter 104 may increment but the application does not process the counter 104. In various embodiments, when the mobile device 110 is woken up, NFC may be enabled and the device 110 may be configured to read available tags, but no action is taken responsive to the reads.

To keep the counter 104 in sync, an application, such as a background application, may be executed that can be configured to detect when the mobile device 110 wakes up and synchronize with the server 120 indicating that a read that occurred due to detection to then move the counter 104 forward. In other examples, Hashed One Time Password may be utilized such that a window of mis-synchronization may be accepted. For example, if within a threshold of 10, the counter 104 may be configured to move forward. But if within a different threshold number, for example within 10 or 1000, a request for performing re-synchronization may be processed which requests via one or more applications that the user tap, gesture, or otherwise indicate one or more times via the user's device. If the counter 104 increases in the appropriate sequence, then it possible to know that the user has done so.

The key diversification technique described herein with reference to the counter 104, master key 105, and diversified key 106 is one example of encryption and/or decryption a key diversification technique. This example key diversification technique should not be considered limiting of the disclosure, as the disclosure is equally applicable to other types of key diversification techniques.

During the creation process of the contactless card 101, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 101. By using the key diversification process, one or more keys may be derived from a master key based upon uniquely identifiable information for each entity that requires a key.

In various embodiments, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In various embodiments, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 5:
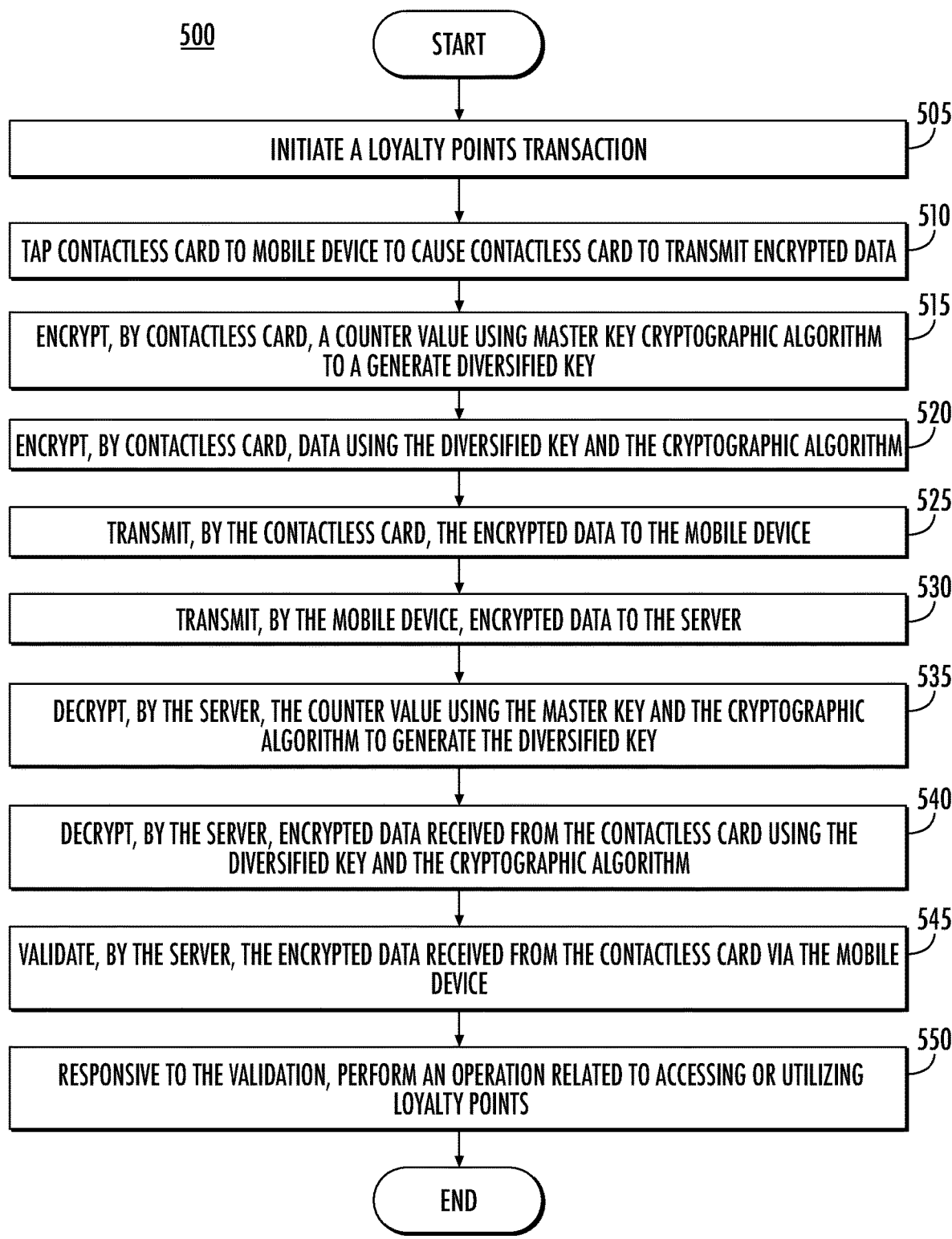
FIG. 5 illustrates an embodiment of a first logic flow.

FIG. 5 illustrates an embodiment of a logic flow 500. The logic flow 500 may be representative of some or all of the operations executed by one or more embodiments described herein. For example, the logic flow 500 may include some or all of the operations to verify or authenticate a user utilizing an online authentication technique to access one or more accounts associated with loyalty points and/or otherwise utilize the loyalty points. Embodiments are not limited in this context.

As shown, the logic flow 500 begins at block 505, where at least one of the authentication application 114, the OS 112, the management application 123, and/or any other suitable application may initiate a transaction to verify an identity of a user and generate a barcode to access a feature associated with access application 116. In various embodiments, the verification may commence by tapping the contactless card 101 on the mobile device 110. In various embodiments, the access application 116 provides a prompt with a precondition for receiving the tap prompt or immediately after the tap takes place, but prior to any additional online verification operations, to enter user credentials for comparison for a first-level and/or second-level of information access in relation to access application 116, where the nature of the first-level features is described elsewhere herein. In various embodiments, the user credential is associated with a user profile and entered into an interface provided by the mobile device 110, where as stated, the first application user credential may include biometrics data, an established gesture associated with user recognition, a username and password combination, and/or the like. The first application user credential may be transmitted by the authentication application 114 to the management application 123 of the server 120, where the first application user credential is compared to a stored second credential.

At block 510, and pursuant to various embodiments, a communication between the mobile device 110 and the contactless card 101 is initiated, where the communication utilizes a card reader 118 and where the communication is based on an NFC protocol. In various embodiments, the communication is condition about the first-level comparison resulting in a match, and in various embodiments, instead of sending the first application credential for comparison at the server 120, the comparison is done between the mobile device 110 and the contactless card 101, where the stored second credential is stored in a memory 102 of the contactless card. In various embodiments, the comparison with respect to the user credential is omitted, and a tap of the contactless card 101 on the mobile device 110 initiates a prompt to select which application requires authentication, e.g. access application 116, and the NFC communication between the contactless card 101 and the mobile device 110 commences to initiate online verification or authentication of a user using a payment protocol consistent with an EMV standard, but for purposes that include a verification or authentication for purposes other than merely completing a sale or purchase. In various embodiments, as stated above a user taps the contactless card 101 to the mobile device 110 to cause the contactless card 101 to generate and transmit encrypted data (e.g., the encrypted customer ID 109). The contactless card 101 may increment the counter value 104 in the memory 102 responsive to receiving the indication to generate encrypted data.

In various embodiments, at block 515, the contactless card 101 generates a diversified key 106 using the counter value 104 and the master key 105 in the memory 102 and a cryptographic algorithm. At block 520, the contactless card 101 encrypts data (e.g., the customer identifier 107) using the diversified key 106 and the cryptographic algorithm, generating encrypted data (e.g., the encrypted customer ID 109).

At block 525, the contactless card 101 may transmit the encrypted data to the account application 113 of the mobile device 110, e.g., using NFC. In at least one embodiment, the contactless card 101 further includes an indication of the counter value 104 along with the encrypted data. At block 530, the account application 113 of the mobile device 110 may transmit the data received from the contactless card 101 to the management application 123 of the server 120. At block 535, the management application 123 of the server 120 may generate a diversified key 106 using the master key 105 and the counter value 104 as input to a cryptographic algorithm. In one embodiment, the management application 123 uses the counter value 104 provided by the contactless card 101. In another embodiment, the management application 123 increments the counter value 104 in the memory 122 to synchronize the state of the counter value 104 in the memory 122 with the counter value 104 in the memory 102 of the contactless card 101.

At block 540, the management application 123 decrypts the encrypted data received from the contactless card 101 via the mobile device 110 using the diversified key 106 and a cryptographic algorithm. Doing so may yield at least the customer identifier 107. By yielding the customer identifier 107, the management application 123 may validate the data received from the contactless card 101 at block 545. For example, the management application 123 may compare the customer identifier 107 to a customer identifier for the associated account in the account data 124a, and validate the data based on a match. Doing so may cause the management application 123 to transmit an indication of the validation to the mobile device 110.

At block 550, responsive to the decryption and validation of blocks 540 and 545, the management application 123 can provide access to one or more loyalty point accounts 124b and can permit redemptions of one or more loyalty points associated therewith, including loyalty points associated with retailer 148. Although depicted as being stored in the server 120, the points application 117a may include an instance of the loyalty point accounts 124b. In various embodiments, prior to the decryption, the management application 123 may generate an authorization token that can be transmitted to the barcode generating application 117b of either the contactless card 101 and/or the mobile device 110, where the barcode can then be displayed by the display 140 and/or the display 141, where the authorization token can impose one or more restrictions and conditions as outlined above with respect to the various components of FIG. 1, and the barcode can be scanned by any suitable scanning device in order to enable the decryption and utilization of any loyalty points associated with loyalty points accounts 124b. In various embodiments, the barcode generation application 117 may generate a barcode using any suitable technique for barcode generation, where the generated barcode may be displayed on a display 140 of the mobile device and/or a display 141 of the contactless card 101.

Figure 6:
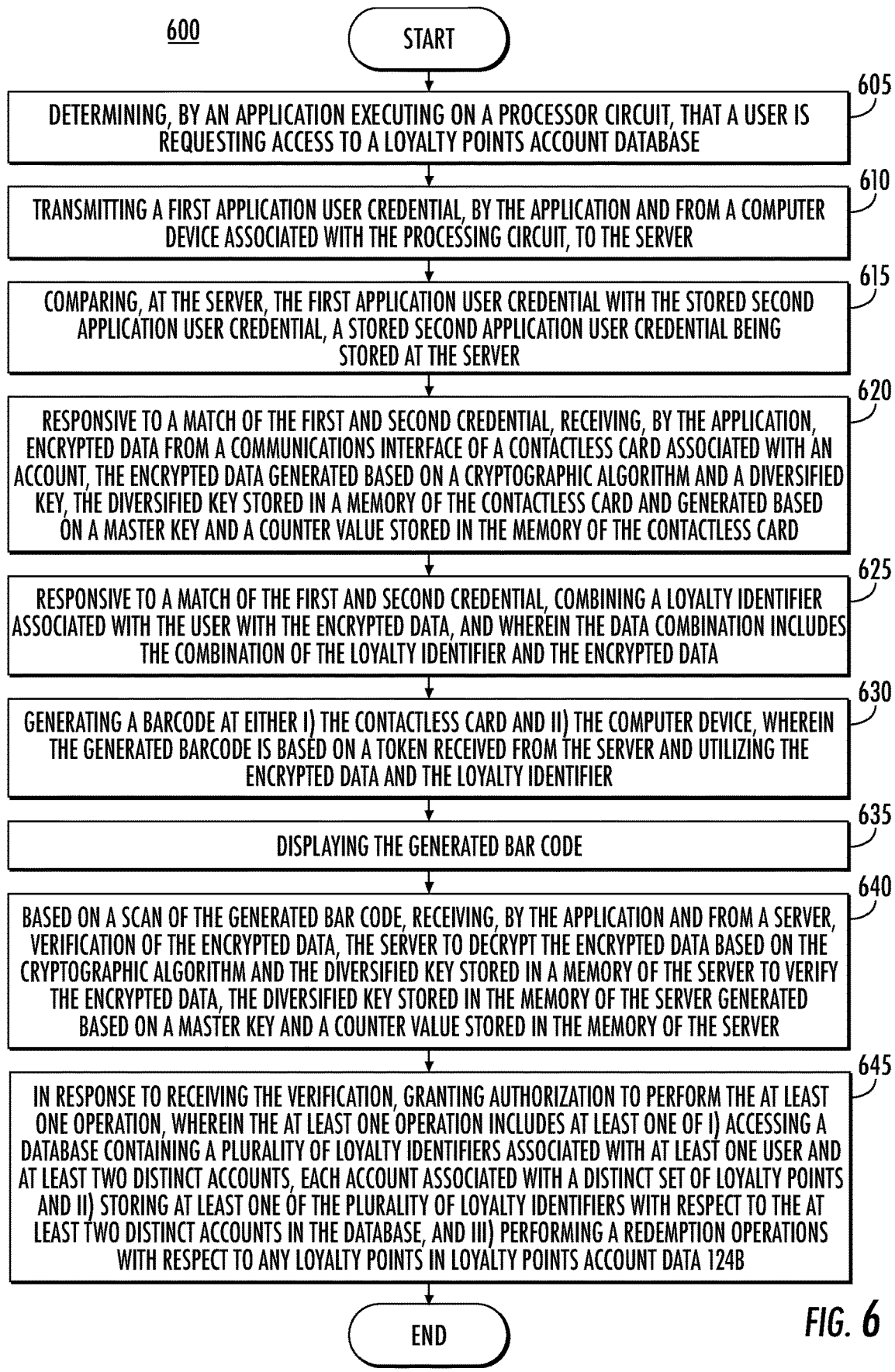
FIG. 6 illustrates an embodiment of a second logic flow.

FIG. 6 illustrates an embodiment of a logic flow 600. The logic flow 600 may be representative of some or all of the operations executed by one or more embodiments described herein. For example, the logic flow 600 may include utilizing the generated barcode associated with FIG. 5 to authorize a transaction associated with access application 116. Embodiments are not limited in this context.

As shown, the logic flow 600 begins after one or more operations of FIG. 5 are completed, where in various embodiments, the flow begins at block 530 of FIG. 5. At block 605, any suitable component of system 100 can determine, by an application executing on a processor circuit, that a user is requesting access to a loyalty points account database. At block 610, utilizing any suitable technique as discussed herein, any suitable component of system 100 can transmit a first application user credential, by the application and from a computer device associated with the processing circuit, to the server 120. At block 615, any suitable component of system 100 can compare, at the server, the first application user credential with the stored second application user credential, a stored second application user credential being stored at the server. At block 620, responsive to a match of the first and second credential, any suitable component of system 100, may receive, by the application, encrypted data from a communications interface of a contactless card associated with an account, the encrypted data generated based on a cryptographic algorithm and a diversified key, the diversified key stored in a memory of the contactless card and generated based on a master key and a counter value stored in the memory of the contactless card. At block 625, responsive to a match of the first and second credential, any suitable component of system 100 can combine a loyalty identifier associated with the user with the encrypted data, and wherein the data combination includes the combination of the loyalty identifier and the encrypted data. The combination (and/or any other combination operation described herein) may be based on a logical operation. The logical operation may be an exclusive OR operation. At block 630, any suitable component of system 100 can Perform an operation, at the server, on the received encrypted data and the loyalty identifier. At block 635, any suitable component of system 100 can generate a barcode at either i) the contactless card and ii) the computer device, wherein the generated barcode is based on a token received from the server and utilizing the encrypted data and the loyalty identifier. At block 640, any suitable component of system 100 can display the generated bar code. At block 645, any suitable component of system 100 can based on a scan of the generated bar code, receive, by the application and from a server, verification of the encrypted data, the server to decrypt the encrypted data based on the cryptographic algorithm and the diversified key stored in a memory of the server to verify the encrypted data, the diversified key stored in the memory of the server generated based on a master key and a counter value stored in the memory of the server. At block 650, any suitable component of system 100 can, in response to receiving the verification, grant authorization to perform the at least one operation, wherein the at least one operation includes at least one of i) accessing a database containing a plurality of loyalty identifiers associated with at least one user and at least two distinct accounts, each account associated with a distinct set of loyalty points and ii) storing at least one of the plurality of loyalty identifiers with respect to the at least two distinct accounts in the database In various embodiments, the contactless card 101 may be tapped to a device, such as one or more computer kiosks or terminals, to verify identity so as to receive a transactional item responsive to a purchase, such as a coffee. By using the contactless card 101, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless card 101 and the device, which may be configured to process one or more tap gestures. As explained above, the one or more applications may be configured to validate identity of the user and then cause the user to act or respond to it, for example, via one or more tap gestures. In various embodiments, data for example, bonus points, loyalty points, reward points, healthcare information, etc., may be written back to the contactless card.

In various embodiments, the contactless card 101 may be tapped to a device, such as the mobile device 110. As explained above, identity of the user may be verified by the one or more applications which can then grant the user a desired benefit based on verification of the identity.

In various embodiments, an example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in various embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In various embodiments, the contactless card 101 can selectively communicate information depending upon the recipient device. Once tapped, the contactless card 101 can recognize the device to which the tap is directed and based on this recognition the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to a various scenarios, including card activation, balance transfers, account access attempts, commercial transactions, and step-up fraud reduction.

If the tap of the contactless card 101 is directed to a device running Apple's iOS® operating system, e.g., an iPhone, iPod, or iPad, the contactless card can recognize the iOS® operating system and transmit data appropriate data to communicate with this device. For example, the contactless card 101 can provide the encrypted identity information necessary to authenticate the card using NDEF tags via, e.g., NFC. Similarly, if the contactless card tap is directed to a device running the Android® operating system, e.g., an Android® smartphone or tablet, the contactless card can recognize the Android® operating system and transmit appropriate and data to communicate with this device (such as the encrypted identity information necessary for authentication by the methods described herein).

As another example, the contactless card tap can be directed to a POS device, including without limitation a kiosk, a checkout register, a payment station, or other terminal. Upon performance of the tap, the contactless card 101 can recognize the POS device and transmit only the information necessary for the action or transaction. For example, upon recognition of a POS device used to complete a commercial transaction, the contactless card 101 can communicate payment information necessary to complete the transaction under the EMV standard.

In various embodiments, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In various embodiments the POS device can be affiliated with an authorized merchant or other entity familiar with certain contactless cards or accustomed to performing certain contactless card transactions. However, it is understood such an affiliation is not required for the performance of the described methods.

In various embodiments, such as a shopping store, grocery store, convenience store, or the like, the contactless card 101 may be tapped to a mobile device without having to open an application, to indicate a desire or intent to utilize one or more of reward points, loyalty points, coupons, offers, or the like to cover one or more purchases. Thus, an intention behind the purchase is provided.

In various embodiments, the one or more applications may be configured to determine that it was launched via one or more tap gestures of the contactless card 101, such that a launch occurred at 3:51 pm, that a transaction was processed or took place at 3:56 pm, in order to verify identity of the user.

In various embodiments, the one or more applications may be configured to control one or more actions responsive to the one or more tap gestures. For example, the one or more actions may comprise collecting rewards, collecting points, determine the most important purchase, determine the least costly purchase, and/or reconfigure, in real-time, to another action.

In various embodiments, data may be collected on tap behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In various embodiments, the secondary information may be stored within the contactless card.

In various embodiments, the device may comprise an application that splits bills or check for payment amongst a plurality of individuals. For example, each individual may possess a contactless card, and may be customers of the same issuing financial institution, but it is not necessary. Each of these individuals may receive a push notification on their device, via the application, to split the purchase. Rather than accepting only one card tap to indicate payment, other contactless cards may be used. In various embodiments, individuals who have different financial institutions may possess contactless cards 101 to provide information to initiate one or more payment requests from the card-tapping individual.

In various embodiments, the present disclosure refers to a tap of the contactless card. However, it is understood that the present disclosure is not limited to a tap, and that the present disclosure includes other gestures (e.g., a wave or other movement of the card).

Figure 7:
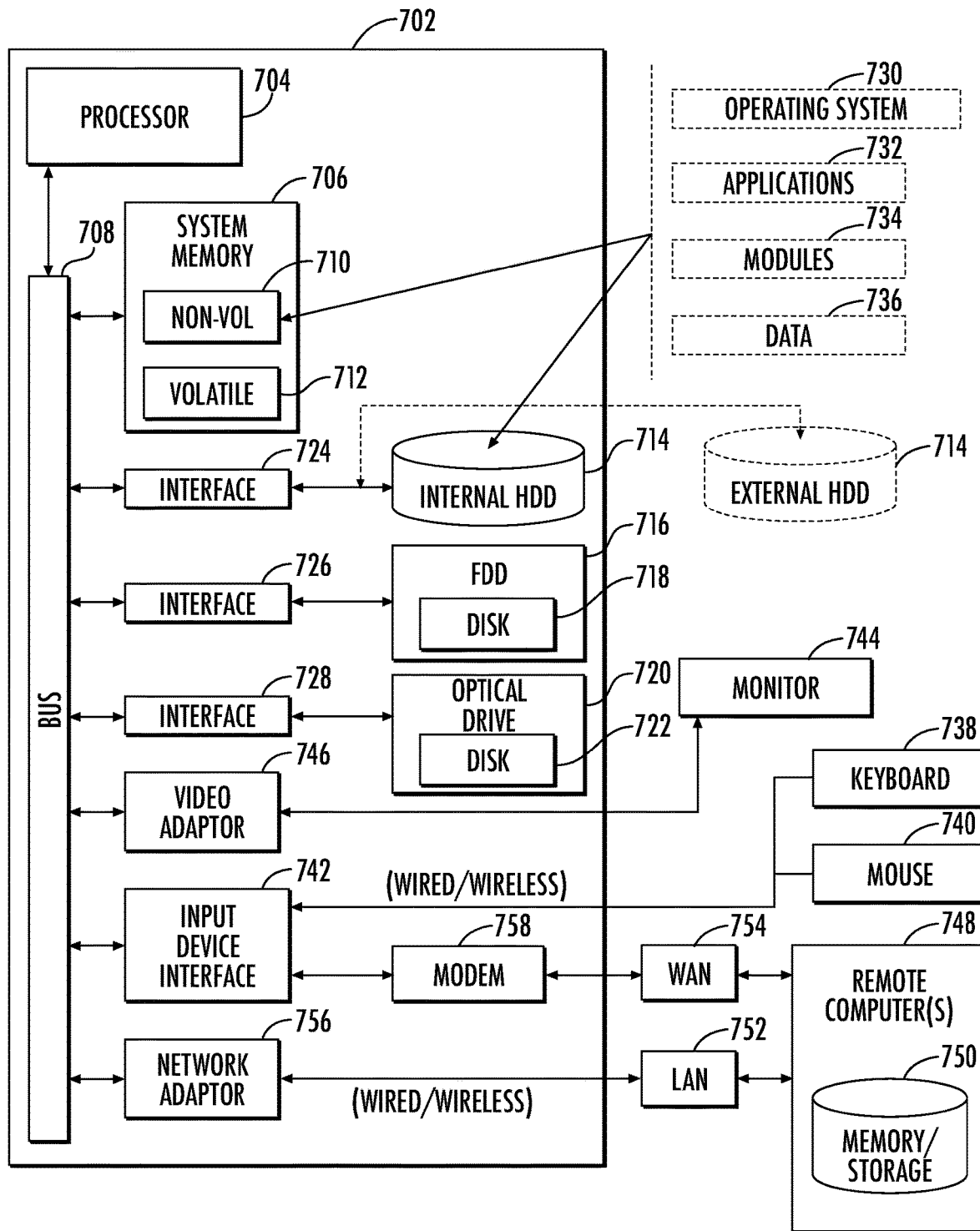
FIG. 7 illustrates an embodiment of a computing architecture.

FIG. 7 illustrates an embodiment of an exemplary computing architecture 700 comprising a computing system 702 that may be suitable for implementing various embodiments as previously described. In various embodiments, the computing architecture 700 may comprise or be implemented as part of an electronic device. In various embodiments, the computing architecture 700 may be representative, for example, of a system that implements one or more components of the system 100. In various embodiments, computing system 702 may be representative, for example, of the mobile devices 110 and server 120 of the system 100. The embodiments are not limited in this context. More generally, the computing architecture 700 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 702 includes various common computing elements, such as one or more processors, multi-core processors, co-processors, processing circuitry memory units, chipsets, controllers, peripherals, interfaces, oscillators, timing devices, video cards, audio cards, multimedia input/output (I/O) components, power supplies, and so forth. The embodiments, however, are not limited to implementation by the computing system 702.

As shown in FIG. 7, the computing system 702 comprises a processor 704, a system memory 706 and a system bus 708. The processor 704 can be any of various commercially available computer processors or computer process circuitry, including without limitation an AMD® Athlon®, Duron® and Opteron® processors; ARM® application, embedded and secure processors; IBM® and Motorola® Dragon Ball® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 704. The processor 704 may be configured by associated memory instructions contained in the system memory 706, such that when the instructions re executed on the processor (e.g. processor circuitry) 704, the processor may carry out one or more operations associated with any one of FIG. 5-FIG. 7B and/or any other operation or technique as disclosed herein.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computing system 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies. The computing system 702 is generally is configured to implement all logic, systems, methods, apparatuses, and functionality described herein with reference to FIGS. 1-6.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In various embodiments, the one or more application programs 732, other program modules 734, and program data 736 can include, for example, the various applications and/or components of the system 100, e.g., the operating system 112, account application 113, authentication application 114, other applications 115, access application 116, and the management application 123.

A user can enter commands and information into the computing system 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computing system 702. In addition to the monitor 744, a computer typically includes other peripheral output devices, such as speakers, printers, and so forth.

The computing system 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computing system 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 752 and the WAN 754.

When used in a LAN networking environment, the computing system 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computing system 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computing system 702, or portions thereof, can be stored in the remote memory/storage device 750. It will be appreciated that the network connections shown are exemplary and other means of establishing a communications link between the computers can be used.

The computing system 702 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least various embodiments may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Various embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A method, comprising:
receiving, by an application executing on a processor circuit, a first request to access a loyalty points account comprising a plurality of loyalty points;
receiving, by the application, encrypted data from a contactless card;
transmitting, by the application to a server, the encrypted data;
receiving, by the application and from the server, a decryption result;
determining, by the application based on the decryption result, that the server decrypted the encrypted data;
receiving, by the application based on the determination that the server decrypted the encrypted data, a second request to enable one or more options for the plurality of loyalty points;
authorizing, by the application based on the determination that the server decrypted the encrypted data, the second request to enable one or more options for the plurality of loyalty points; and
displaying, by the application based on the authorization of the second request, the one or more options for the plurality of loyalty points on a display.

2. The method of claim 1, wherein the one or more options comprise an option for viewing a balance of the loyalty points account.

3. The method of claim 1, wherein the one or more options comprise an option for redeeming one or more of the plurality of loyalty points.

4. The method of claim 1, wherein the one or more options comprise an option for transferring loyalty points to another loyalty points account.

5. The method of claim 1, wherein the encrypted data comprises an identifier to identify the loyalty points account.

6. The method of claim 5, further comprising:
receiving, by the application from the server, a token based on the identifier.

7. The method of claim 6, further comprising:
generating, by the application, a barcode based on the token.

8. A non-transitory computer-readable storage medium, the computer-readable storage medium including instructions that when executed by a processor, cause the processor to perform the steps of:
receiving a first request to access a loyalty points account comprising a plurality of loyalty points;
receiving encrypted data from a contactless card;
transmitting, to a server, the encrypted data;
receiving, from the server, a decryption result;
determining, based on the decryption result, that the server decrypted the encrypted data;
receiving, based on the determination that the server decrypted the encrypted data, a second request to enable one or more options for the plurality of loyalty points;
authorizing, based on the determination that the server decrypted the encrypted data, the second request to enable one or more options for the plurality of loyalty points; and
displaying, based on the authorization of the second request, the one or more options for the plurality of loyalty points on a display.

9. The computer-readable storage medium of claim 8, wherein the one or more options comprise an option for viewing a balance of the loyalty points account.

10. The computer-readable storage medium of claim 8, wherein the one or more options comprise an option for redeeming one or more of the plurality of loyalty points.

11. The computer-readable storage medium of claim 8, wherein the one or more options comprise an option for transferring loyalty points to another loyalty points account.

12. The computer-readable storage medium of claim 8, wherein the encrypted data comprises an identifier to identify the loyalty points account.

13. The computer-readable storage medium of claim 12, wherein the instructions, that when executed by the processor, further cause the processor to perform the step of:
receiving, from the server, a token based on the identifier.

14. The computer-readable storage medium of claim 13, wherein the instructions, that when executed by the processor, further cause the processor to perform the step of:
generating a barcode based on the token.

15. A computing apparatus comprising:
a processor; and
a memory storing instructions that, when executed by the processor, cause the processor to perform the steps of:
receiving a first request to access a loyalty points account comprising a plurality of loyalty points;
receiving encrypted data from a contactless card;
transmitting, to a server, the encrypted data;
receiving, from the server, a decryption result;
determining, based on the decryption result, that the server decrypted the encrypted data;
receiving, based on the determination that the server decrypted the encrypted data, a second request to enable one or more options for the plurality of loyalty points;
authorizing, based on the determination that the server decrypted the encrypted data, the second request to enable one or more options for the plurality of loyalty points; and
displaying, based on the authorization of the second request, the one or more options for the plurality of loyalty points on a display.

16. The computing apparatus of claim 15, wherein the one or more options comprise an option for viewing a balance of the loyalty points account.

17. The computing apparatus of claim 15, wherein the one or more options comprise an option for redeeming one or more of the plurality of loyalty points.

18. The computing apparatus of claim 15, wherein the one or more options comprise an option for transferring loyalty points to another loyalty points account.

19. The computing apparatus of claim 15, wherein the encrypted data comprises an identifier to identify the loyalty points account.

20. The computing apparatus of claim 19, wherein the instructions, that when executed by the processor, further cause the processor to perform the step of:
receiving, from the server, a token based on the identifier.

* * * * *